United States Patent [19]
Close

[11] 3,869,673
[45] Mar. 4, 1975

[54] METHOD AND APPARATUS FOR MEASURING MULTIPATH DISTORTION

[75] Inventor: Ernest Frederick Close, Fort Wayne, Ind.

[73] Assignee: Magnavox Company, Fort Wayne, Ind.

[22] Filed: May 21, 1973

[21] Appl. No.: 361,902

[52] U.S. Cl. .................. 325/393, 325/67, 325/455, 328/163
[51] Int. Cl. .......................................... H04b 1/16
[58] Field of Search ....... 325/67, 65, 363, 398, 473, 325/455; 328/163

[56] References Cited

UNITED STATES PATENTS

| | | | |
|---|---|---|---|
| 1,636,436 | 7/1927 | Rettenmeyer | 325/67 |
| 3,525,045 | 8/1970 | Recklinghausen | 325/363 |
| 3,660,607 | 5/1972 | Mack | 325/363 |
| 3,696,301 | 10/1972 | Hoshi | 325/398 |

*Primary Examiner*—George H. Libman
*Attorney, Agent, or Firm*—Thomas A. Briody; William J. Streeter; William W. Halloway, Jr.

[57] ABSTRACT

A quantitative approximation of the distortion due to multipath reception of a frequency modulated or other angle modulated signal is obtained by detecting the frequency variations in the received signal and providing a first output signal, such as the discriminator output, indicative of those frequency variations and additionally detecting the amplitude variations in that same signal and providing a second output signal indicative of those amplitude variations. The first and second output signals are then correlated, with the degree of correlation providing a quantitative measure of the multipath distortion present in the received signal. In a first embodiment, the correlation is obtained using a doubly balanced mixer or multiplier circuit while in a second embodiment this correlation is approximated by the use of a single balanced mixer.

12 Claims, 3 Drawing Figures

FIG. 1

PATENTED MAR 4 1975

3,869,673

METHOD AND APPARATUS FOR MEASURING MULTIPATH DISTORTION

BACKGROUND OF THE INVENTION

When a transmitted signal is received over more than one transmission path the phenomenon of multipath reception occurs and generally degrades or causes distortion in the received signal. This distortion is normally alleviated or minimized by the proper orientation of a directional antenna associated with the receiver; however, the proper orientation of that antenna "by ear" or by simply measuring signal strength is extremely difficult since the position for maximum signal strength is very often not optimum for minimizing the multipath distortion.

The distortion caused by multipath reception is a frequency dependent trait because the various paths followed from the transmitter to receiver have different lengths and the interference effects which constitute the multipath distortion depend on the differences in path lengths expressed in wavelengths.

Prior art attempts at measuring the distortion due to multipath reception have included providing a panel display meter, the deflection of which is proportional to amplitude modulation of the FM signal. Such a scheme, of course, indicates noise or other interference in addition to multipath distortion. Another prior art scheme for providing a distortion indication has been to employ a small cathode ray tube to illustrate variations in signal strength versus instantaneous signal frequency. With this scheme, a straight horizontal line on the cathode ray tube indicates no multipath distortion, and departures from a straight line indicate varying degrees of multipath distortion. However, amplitude changes due to noise are also displayed. Further, the cathode ray tube display approach is confusing and difficult for the average observer to use.

It is, therefore, a general object of the present invention to provide an indication of multipath distortion in a received signal.

It is another object of the present invention to provide such an indication of multipath distortion which is substantially unaffected by noise and other interference.

It is a further object of the present invention to provide a multipath distortion indication which is easy to read and interpret.

Yet another object of the present invention is to provide a multipath distortion indication in an economical manner.

SUMMARY OF THE INVENTION

The foregoing as well as numerous other objects and advantages of the present invention are achieved by providing means for frequency demodulating received signals, means for amplitude demodulating those same received signals, and means coupled to each demodulating means to provide an indication of the correlation between frequency modulation and amplitude modulation in the received signals.

In one preferred embodiment, a panel display meter is caused to deflect only when amplitude variations correlate with frequency variations, and this correlation is derived from an analog multiplier, the inputs to which are a demodulated FM signal and the absolute value or a unidirectional likeness of the instantaneous amplitude variations of that same signal. In a second preferred embodiment, a single balanced mixer is employed instead of the analog multiplier or double balanced mixer with a resulting slight loss in performance and substantial gain in economy. Both embodiments also yield a side benefit in that mistuning produces a strong multipath meter deflection.

It is therefore an additional object of the present invention to provide method and apparatus for indicating the degree of correlation between amplitude and frequency of a received frequency modulated signal.

The subject matter, which I regard as my invention, is particularly pointed out and distinctly claimed in the concluding portion of this specification. My invention itself, however, together with further objects and advantages thereof, may best be understood by reference to the following description taken in conjunction with the accompanying drawings.

DESCRIPTION OF THE PREFERRED EMBODIMENT

Figure 1:
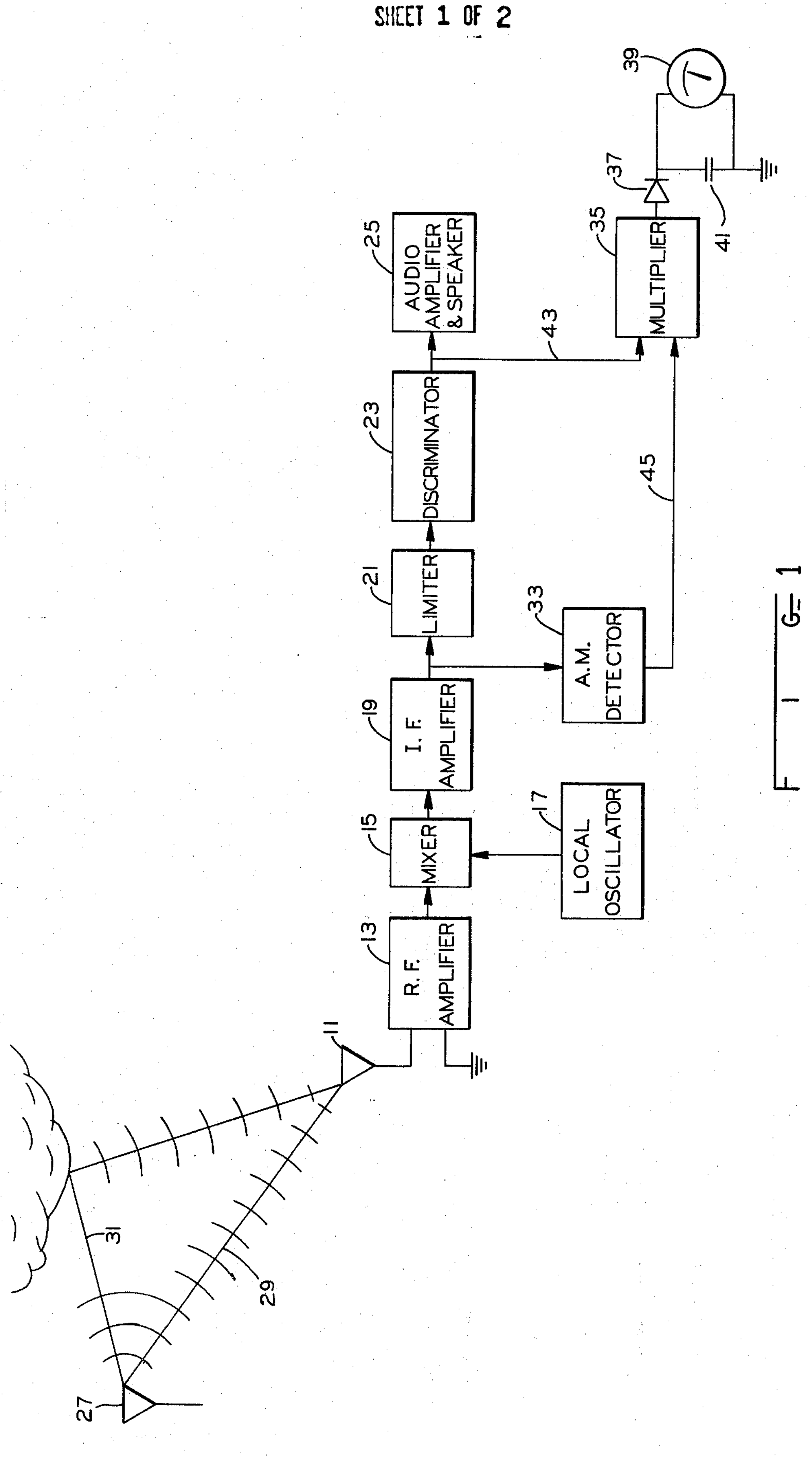
FIG. 1 is a block diagram of a generalized FM receiver, incorporating the FM multipath meter of the present invention and diagrammatically illustrating multipath reception.

Turning first to the block diagram of a heterodyne type receiving device illustrated in FIG. 1, radio frequency signals are received by an antenna 11 and supplied to a radio frequency amplifier stage 13, which is of course, tuned to a particular frequency of interest and which in turn supplies an amplified signal in the frequency range of interest to a mixer 15. A local oscillator 17 supplies another signal of an appropriate frequency for the particular received signal to the mixer 15 and a resulting intermediate frequency signal is supplied from the mixer to the intermediate frequency amplifier 19 for further amplification. The intermediate frequency amplifier 19 is generally tuned to a specific intermediate frequency such as, for example, the 10.7 megacycle intermediate frequency typically used in FM receivers. This amplified intermediate frequency signal is then supplied to a limiter 21 which functions to standardize the amplitude of the signal, and after limiting, that signal is supplied to a discriminator 23 which converts the frequency variations in the signal to amplitude variations, and these amplitude variations are then supplied to an audio amplifier stage and speaker as represented at 25.

In many receivers, the limiter and discriminator functions may be performed simultaneously but are illustrated as separate functions throughout this specification and claims solely for explanation purposes. The FM receiver of FIG. 1, as thus far discussed, is orthodox in its form and any other FM receiver circuit could be employed without departing from the scope of the present invention.

A radio frequency transmitting antenna 27 transmits signals along, for example, straight line path 29 to the receiving antenna 11, and also may transmit along other paths such as an illustrative reflected path 31. Since path 31 is longer than path 29, signals received by the antenna 11 along path 31 will be delayed in time with respect to the signals received along path 29. For a given carrier frequency, this difference in path length may be expressed in wavelengths and, for example, if the path length difference is an integral number of wavelengths, the two received signals will reinforce one another whereas if, for example, the two paths differed by an odd multiple of one-half wavelength, the two signals would tend to cancel one another. If the transmitted carrier is frequency modulated, its wavelength will vary and thus the reinforcing or cancelling effect at the receiving antenna 11 will vary in accordance with the particular frequency modulation imparted to the signal. In other words, the amplitude or signal strength at the antenna 11 will vary with frequency when the multipath signal propagation is involved.

The present invention takes advantage of this relationship by providing an amplitude modulation detector 33, prior to the limiter stage 21, and supplying the amplitude variations to a multiple input amplifying device such as the multiplier 35. Another input to this multiplier 35 is the detected FM signal from the discriminator 23 and the product of the amplitude variations and corresponding frequency variations is supplied as the output of the multiplier 35 by way of a rectifying means such as the diode 37 to a panel display meter 39. This panel display meter 39 may have a capacitor 41, connected in parallel therewith, to stabilize the meter indications and provide an indication of the average value of the multiplier circuit output. While illustrated as a multiplier, the multiple input amplifier 35 may take on other forms to provide a signal indicative of the correlation between amplitude variations and frequency variations.

The diode 37 acts as a half wave rectifier to provide a unidirectional likeness of the output of the multiplier circuit 35 since without some such device the average value of its output would be zero. Of course, a full wave rectifier could be employed on the multiplier output to thereby provide the absolute value of the product of the signals which also constitutes a unidirectional likeness of those signals. Similarly, half or full wave rectifiers might be employed in the two input lines 43 and 45 to accomplish the same purpose, and if these input unidirectional likenesses of the two signals were first passed through full wave rectifiers, the multiplier circuit would then form the product of the absolute values of those signals, which is of course equivalent to forming the earlier suggested absolute value of the product of the two signals.

Figure 2:
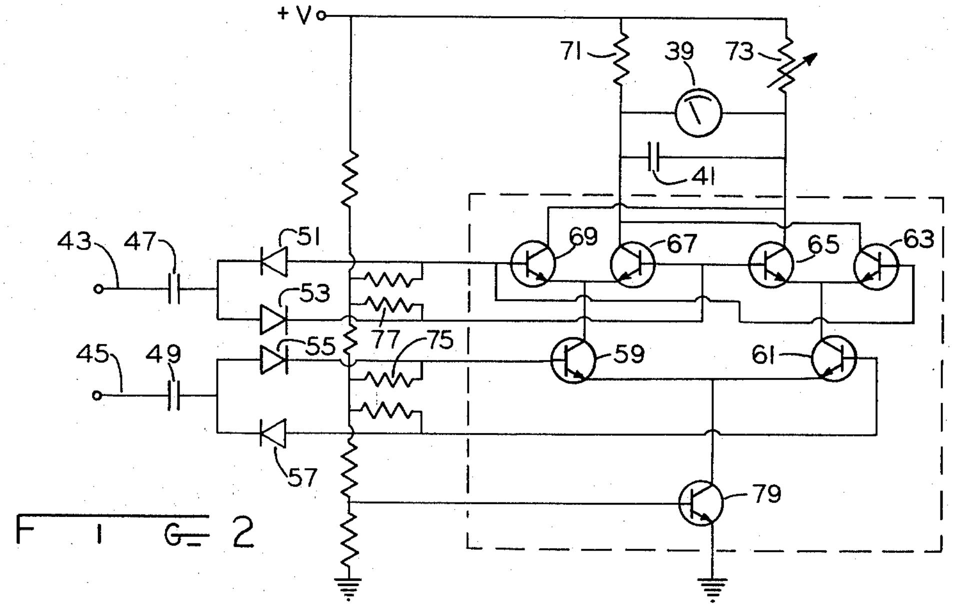
FIG. 2 is a detailed schematic diagram of one possible multiplier for use in the receiver of FIG. 1.

A doubly balanced mixer or full multiplier circuit suitable for use in the general scheme of FIG. 1 and not requiring the diode 37, is illustrated in schematic detail in FIG. 2 wherein reference numerals for corresponding unchanged elements of FIG. 1 are carried over into FIG. 2. Thus, the input lines 43 and 45 contain capacitors 47 and 49 for eliminating the DC component of the detected AM and FM signals. Rectifier means such as the diodes 51, 53, 55 and 57 function to route these two input signals to the proper transistor according to polarity of those signals so as to form an always positive product which is measured as the voltage across capacitor 41 or equivalently the deflection of the meter 39. As with FIG. 1 the capacitor 41 performs an averaging function so that the deflection of the meter 39 is indicative of the average correlation between the frequency variations and amplitude variations. If the frequency variations input on line 43 and the amplitude variations input on line 45 (the choice is arbitrary and the are interchangeable) are both positive at a given time, transistors 59, 65 and 67 will be vigorously conducting. At the same time transistors 61, 63 and 69 will not be conducting to any great extent. A larger current flows from the power source to ground by way of resistor 71, transistor 67, transistor 59, and transistor 79, than any route for current from the power source to ground through resistor 73, thus making the right side of capacitor 41 positive relative to the left side. The meter 39 is connected so an upscale deflection is produced. Similarly, if the input on line 43 is negative and that on line 45 is positive, transistors 63 and 69 will conduct to a lesser degree due to the conduction of diode 51 while transistors 65 and 67 will conduct to a greater degree thus increasing the current flow in resistor 73 relative to that in resistor 71 and increasing the resultant average charge on capacitor 41 as before. Of course, either resistor 71, or as shown, resistor 73 may be made variable in order to appropriately "zero" the meter 39 in the absence of input signals.

From the foregoing it may appear that virtually any combination of input signals at 43 and 45 would cause meter 39 to deflect, but such is not the case. If either signal is absent, no meter deflection can result even if the other signal has considerable amplitude. Since noises in the signals at 43 and 45 result from different mechanisms and in general are not coincident in time, noise does not produce much meter deflection. Simple changes in DC levels are blocked by capacitors 47 and 49 so meter deflection can occur only during the brief period when level changes are transpiring. Without capacitors 47 and 49 or some similar means of removing DC components in signals at 43 and 45, the sensitivity of the circuit would vary widely with signal strength. The meter is deflected only when both signals are changing simultaneously, but regardless of the absolute or relative direction of these changes because of the action of diodes 51, 53, 55 and 57.

Figure 3:
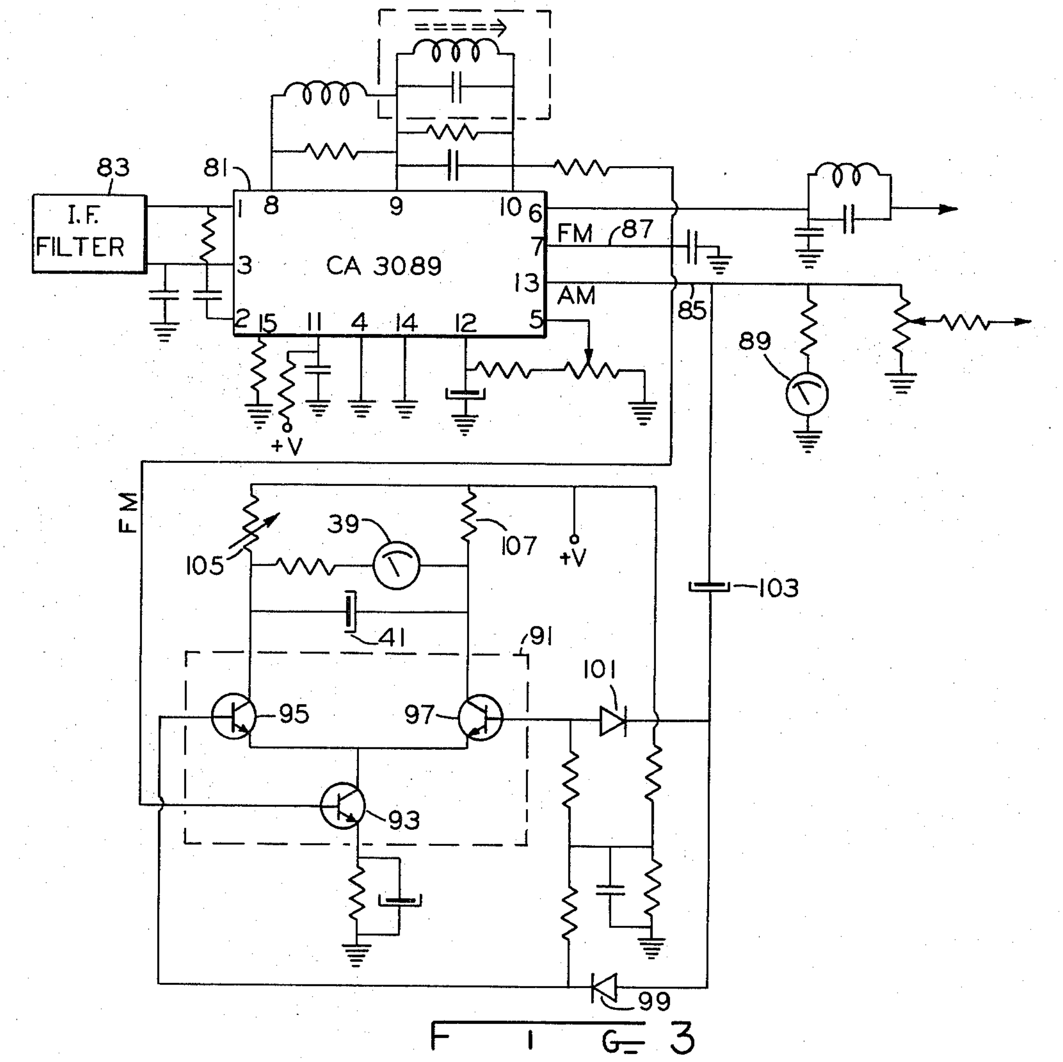
FIG. 3 illustrates a portion of an actual FM receiver, showing in detail a single balanced mixer for correlating the AM and FM demodulated signals.

While the doubly balanced mixer or full multiplier of FIG. 2 yields more nearly theoretically correct indications, a very practical and sufficiently accurate circuit may be devised employing a singly balanced mixer or multiplier such as illustrated in FIG. 3. FIG. 3 constitutes a preferred embodiment of the present invention both because of the economy of the singly balanced mixer and because it allows a small amount of meter deflection due to random uncorrelated noise. This latter effect enhances the usefulness of the circuit because multipath and/or noise causes a meter deflection and informs the user of an unsatisfactory signal condition. In the schematic diagram of FIG. 3 amplitude modulation detection and the limiting and discriminator functions are all performed by an integrated circuit chip 81. This integrated circuit receives an input from the intermediate frequency filter 83 and provides a strong demodulated AM signal on line 85 and a similarly demodulated FM signal on line 87. The AM signal may be employed to drive a signal strength meter 89 and is also employed as one input to a three transistor integrated circuit chip 91. In the embodiment as depicted, excursions of the demodulated FM signal control the current source transistor 93 while the bases of the other two transistors 95 and 97 are coupled by way of diodes 99 and 101 respectively through a DC component removing capacitor 103 to the demodulated AM line. If the AM signal increases, the diode 99 conducts, causing greater conduction through the transistor 95 and thus a greater voltage drop across meter-zeroing variable resistor 105, whereas if the voltage decreases the signal to the base of transistor 97 also decreases and again causes a greater relative current flow in resistor 105 than in resistor 107. Since the current path from the positive direct current supply to ground must be the series combination of one of the transistors 95 and 97 in conjunction with the transistor 93, much larger meter deflections will occur when there is a correlation between FM and AM signals. If only the FM signal is present, current in transistors 95 and 97 change the same amount and no meter deflection results. Thus while the present invention has been described with respect to specific preferred embodiments numerous modifications will suggest themselves to those of ordinary skill in the art. For example, frequency modulation reception has been employed in describing the invention, however, other forms of angle modulation such as phase modulation may experience multipath distortion and such distortion may be measured in accordance with the present invention. Accordingly, the scope of the present invention is to be measured only by that of the appended claims.

I claim:

1. In an FM receiver having a sequentially coupled radio frequency amplifier, mixer, intermediate frequency amplifier, limiter, frequency modulation detector and audio output stages; a circuit for providing a quantitative measure of the distortion present in a received signal due to propagation of that signal along paths of dissimilar lengths comprising:

an amplitude modulation detector having an input coupled to the receiver prior to the limiter and having an output;

multiple input amplifier means for providing an output signal the magnitude of which varies directly as a function of the magnitude of each input signal;

means coupling the output of the amplitude modulation detector to at least one of the amplifier means multiple inputs;

means coupling the output of the frequency modulation detector to at least another of the amplifier means multiple inputs;

indicator means coupled to the output of said amplifier means output to indicate the quantitative measure of said distortion present in a received signal; and wherein the amplifier means comprises a multiplier circuit for forming the instantaneous product of the signals presented to the multiple inputs.

2. The circuit of claim 1 further comprising rectifying means in circuit with at least one of said coupling means to thereby present a unidirectional likeness of the corresponding at least one signal to the corresponding multiple inputs.

3. The circuit of claim 1 wherein said indicator means comprises a panel display meter coupled to the said amplifier means and responsive to the output thereof to provide a visible deflection corresponding to the quantitative measure of distortion present in the received signal.

4. The circuit of claim 3 further comprising a capacitor in parallel with the said panel display meter to stabilize the indication provided by that meter and provide an indication of average distortion present in the received signal.

5. The circuit of claim 4 further comprising rectifying means coupling the amplifier means and the parallel combination of the capacitor and panel display meter to thereby supply a unidirectional likeness of the output of the amplifier means to the said parallel combination.

6. The method of obtaining a quantitative approximation of the distortion due to multipath reception of a frequency modulated signal comprising the steps of:

detecting the frequency variations in a received signal and providing a first output signal indicative of those frequency variations;

detecting the amplitude variations in that same received signal and providing a second output signal indicative of those amplitude variations;

correlating the first and second output signals;

providing an indication of the degree of correlation between the first and second output signals; and wherein the step of correlating includes the steps of providing a unidirectional likeness of the first output signal, providing a unidirectional likeness of the second output signal, and providing the instantaneous product of the two thus provided likenesses.

7. The method of claim 6 further comprising the step of averaging the instantaneous product to thereby provide an indication of average distortion in the received signal.

8. The method of obtaining a quantitative approximation of the distortion due to multipath reception of a frequency modulated signal comprising the steps of:

detecting the frequency variations in a received signal and providing a first output signal indicative of those frequency variations;

detecting the amplitude variations in that same received signal and providing a second output signal indicative of those amplitude variations;

correlating the first and second output signals;

providing an indication of the degree of correlation between the first and second output signals; and wherein the step of correlating includes the step of providing an instantaneous product of the first and second output signals, and providing a unidirectional likeness of the thus provided product.

9. In a receiver for receiving angle modulated signals, a circuit for providing a measure of the distortion present between such received signals due to multipath reception of those signals comprising:

means for angle demodulating the received signals;

means for amplitude demodulating the received signals; and means coupled to each said demodulating means and responsive thereto to provide an indication of the correlation between angle modulation and amplitude modulation in received signals; and wherein the coupled means comprises a multiplier circuit for forming the instantaneous product of signals presented thereto, and rectifier means coupling the multiplier circuit to each said demodulating means to thereby form the product of unidirectional likenesses of the respective demodulated signals.

10. The circuit of claim 9 further comprising a panel display meter coupled to the said multiplier circuit and responsive to the output thereof for providing a visible deflection which indicates a measure of the distortion present in the received signals.

11. The circuit of claim 10 further comprising a capacitor in parallel with the panel display meter to stabilize the meter indication and provide an indication of the average value of the multiplier circuit output.

12. In a receiver for receiving angle modulated signals, a circuit for providing a measure of the distortion present between such received signals due to multipath reception of those signals comprising:

means for angle demodulating the received signals;

means for amplitude demodulating the received signals; and means coupled to each said demodulating means and responsive thereto to provide an indication of the correlation between angle modulation and amplitude modulation in received signals; and wherein the coupled means comprises means for forming the instantaneous product of the signals presented thereto, a panel display meter, and rectifier means coupling the coupled means to the panel display meter to thereby display an indication of the magnitude of a unidirectional likeness of the instantaneous product of the two signals presented to the coupled means.

* * * * *